United States Patent [19]
Kredo et al.

[11] Patent Number: 6,122,349
[45] Date of Patent: *Sep. 19, 2000

[54] SYSTEM AND METHOD FOR DOWNLOADING AN ADSI FEATURE VIA THE INTERNET

[75] Inventors: Thomas J. Kredo; Stephen D. Knight, both of Rochester, N.Y.

[73] Assignee: Nortel Networks Corporation, Ottawa, Canada

[*] Notice: This patent is subject to a terminal disclaimer.

[21] Appl. No.: 08/977,170

[22] Filed: Nov. 24, 1997

[51] Int. Cl.[7] .................................................. H04M 11/00
[52] U.S. Cl. ...................................... 379/93.25; 379/90.01
[58] Field of Search ............................... 379/90.01, 93.01, 379/93.05–93.09, 93.12–93.15, 93.17–93.31, 93.37, 110.01, 387, 900

[56] References Cited

U.S. PATENT DOCUMENTS 5,923,738   7/1999   Cardillo, IV et al. ............... 379/93.25

*Primary Examiner*—Wing F. Chan
*Attorney, Agent, or Firm*—Jaeckle Fleischmann & Mugel, LLP

[57] ABSTRACT

The present invention is an ADSI download system. The system comprises at least one ADSI device, like a screen-display terminal, and one or more remote sites, like computer network site locations, wherein at least one of the remote sites contains ADSI feature files. The ADSI device stores ADSI download feature files in a storage location, receives and stores a downloaded ADSI feature file from the remote site, and uses the ADSI feature. The telephony network connects the ADSI device to the remote site. A network application server connects the remote site comprising of at least one ADSI feature file with the ADSI device. The user of the ADSI device selects the ADSI feature file on the remote site and the ADSI feature file is then retrieved from the remote site and is downloaded into the storage location.

22 Claims, 3 Drawing Sheets

SYSTEM AND METHOD FOR DOWNLOADING AN ADSI FEATURE VIA THE INTERNET

FIELD OF THE INVENTION

This invention generally relates to the field of Analog Display Services Interface (ADSI) and in particular to a system and method to download an ADSI feature via a telephone network to an ADSI screen-display telephone terminal.

BACKGROUND OF THE INVENTION

ADSI is a telecommunications protocol standard developed by Bellcore. ADSI enables alternate voice and data capability over the existing analog telephone network. This capability permits ADSI devices to communicate with users through a familiar voice response audio interface, where the user listens to voice recordings and makes menu selections using a telephone keypad, and with visual menus and information on a screen display, where service selections can be made using soft keys. Currently, ADSI devices are often implemented as screen-display telephone terminals, but there can also be television set-top boxes allowing users to make calls using the television, personal digital assistants (PDAs), pagers, and personal computers that are ADSI capable.

In addition to real-time interactive applications, ADSI also enables program transfer using a capability known as Feature Download. These programs, or service scripts, can be developed on a server and run on a local terminal. In many cases, these scripts are stored in an external database accessible to one telephony platform and for access by the telephony platform serving the user. Therefore, when new features are requested by the user, or are newly added by the server, the scripts are transferred by the telephony platform to the ADSI terminal where they are stored in memory and executed by the terminal until overwritten. These scripts define not only call flow, but also define the soft keys and displays presented to the user during a call.

One example of applied ADSI technology is Northern Telecom's Advanced Call Management Service (ACMS). In ACMS, customer selected features are stored in an external database. When a customer calls in for activation of services, a database lookup is performed so that the appropriate information for that customer can be downloaded to the telephone. The application runs on a Network Applications Vehicle (NAV), that is typically a UNIX-based telephony platform, and reads an object file to get information concerning the call flow. The NAV presents the call flow, including ADSI commands, to the end user and as a result a new application is presented to the terminal.

Some telephone networks operate a UNIX-based telephony platform that can operate ADSI technology (ADSI telephone networks). Other telephone networks operate on less advanced telephony platforms that cannot operate ADSI technology. Thereby, some users are excluded from the opportunity to use ADSI technology by their telephone network.

To further confuse the matter, each ADSI telephone network can operate distinct ADSI technology. ADSI technology is divided into ADSI feature files, such as custom local area signaling services (CLASS) and custom calling features (CCF). As with all technology, each ADSI feature file continues to improve and for each improvement the ADSI feature file becomes more expensive and larger. Due to the ever increasing program size of each ADSI feature file the ADSI telephone networks are losing valuable memory on their telephone platforms. With each improvement each ADSI telephone network decides whether to incorporate the improvement in their telephone platform or wait for a further improvement. Thus, each ADSI telephone network has its own ADSI feature files.

The capability of ADSI devices have been explored to provide users with more advanced consumer-based telephone services. However, ADSI devices have not previously been integrated successfully and effectively with the vast resources of computer network sites, particularly on the Internet, to download and standardize ADSI feature files for all users of ADSI devices. The present invention is designed to resolve this inadequacy.

In addition to permitting ADSI devices to download ADSI feature files from the Internet, the proposed ADSI Internet interface would allow all users to use the most advanced ADSI features files on all telephone networks. Therefore, a need exists for a system and method that would allow users to access and download ADSI feature files from the Internet to their ADSI system.

SUMMARY OF THE INVENTION

The present invention is an ADSI download system. The system comprises at least one ADSI device, like a screen-display terminal, and one or more remote sites, like computer network site locations, wherein at least one of the remote sites contains ADSI feature files. The ADSI device stores ADSI download feature files in a storage location, receives and stores a downloaded ADSI feature file from the remote site, and uses the ADSI feature. The telephony network connects the ADSI device to the remote site. A network application server connects the remote site comprising of at least one ADSI feature file with the ADSI device. The user of the ADSI device selects the ADSI feature file on the remote site and the ADSI feature file is then retrieved from the remote site and is downloaded into the storage location.

DETAILED DESCRIPTION OF THE INVENTION

Figure 1:
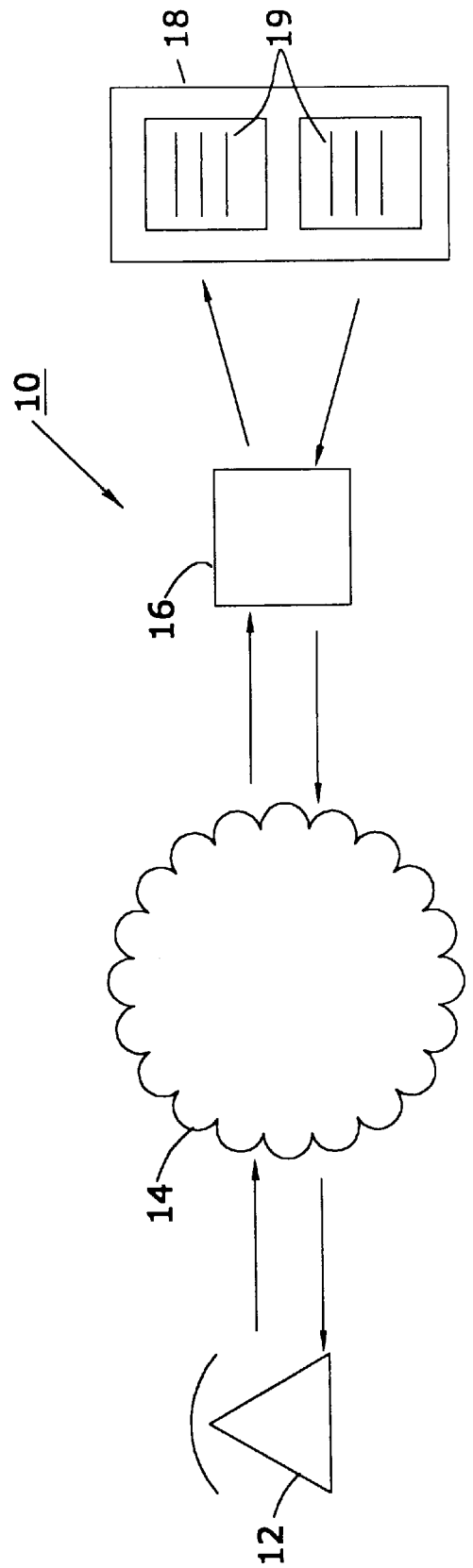
FIG. 1 is a schematic of a telephone system of the present invention.

FIG. 1 is a schematic of an ADSI download system 10. The system 10 comprises at least one ADSI device 12, like a screen-display terminal, a telephone network 14, a network application server 16 and one or more remote sites 18, like a computer network site location. The computer network site location 18 contains an ADSI feature file 19.

Figure 2:
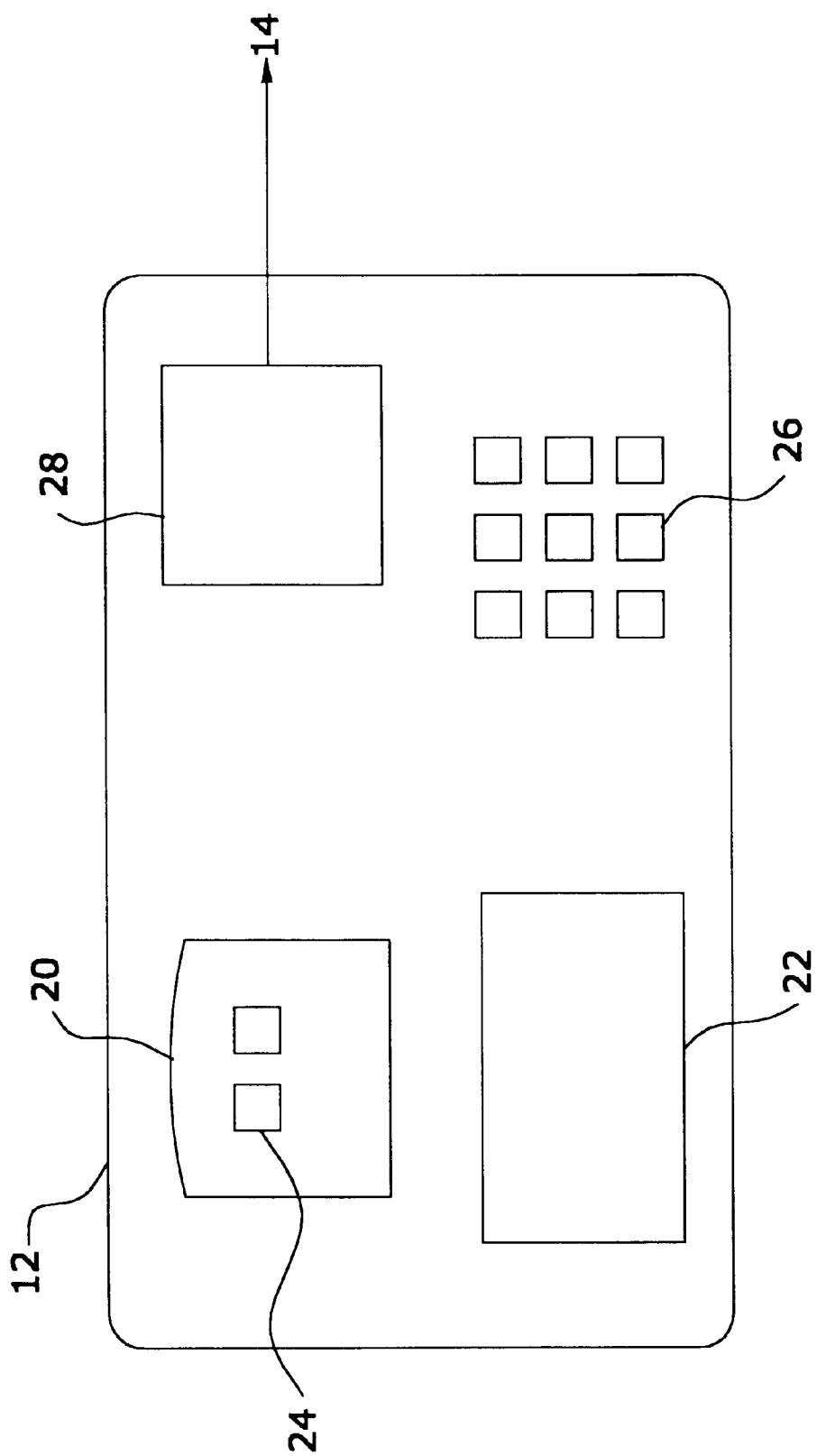
FIG. 2 is a schematic of an ADSI screen-display terminal.

The device 12 can be any ADSI device such as a telephone, television or computer. The ADSI screen-display terminal 12, as shown in FIG. 2, comprises a display-screen 20, a storage location 22 (typically a memory device such as EPROM or EEPROM), soft keys 24 on the screen, numeric keyboard 26 on the terminal 12 and a receiver 28 to transmit voice and data to the telephone network 14. The terminal 12 stores ADSI download feature files in storage location 22, transmits an ADSI feature file request, receives and stores a downloaded ADSI feature file from the computer network site 18, and uses the ADSI feature file. Terminal 12 transmits and receives data and voice to and from the network application server 16. Other terminals (not shown) on network 14 or other networks (not shown) also transmit and receive data and voice to and from terminal 12 on network 14.

The telephone network 14 connects the ADSI screen-display telephone terminal 12 to the network application server 16. The telephone network 14 can be a private or a public telephone network system.

The network application server 16 connects to at least one computer network site location 18 having ADSI feature file 19 to transmit and receive data between each other. The network application server 16 connects the computer network site 18 to the telephone network 14. The network application server 16 is any server, such as a UNIX-based telephone platform or a PC-computer.

The computer network site 18 is preferably a publicly available network system, such as an Internet site or a world wide web page on the Internet. The Internet, or "net," fueled by the popularity of the World Wide Web (WWW or Web), has exhibited significant growth over the past few years. At present, to access the information available on the Web, users typically use standard computer equipment, such as a home personal computer with a display and modem, and an Internet connection.

In the present invention, several types of Internet connections are available. For example, to use an Internet connection from Internet Service Providers (ISPs), the user dials from ADSI screen-display telephone terminal 12 into the server 16 at the ISP's facility using a modem and/or standard telephone line. The server 16 in turn provides the user with access to the Internet. Through this Internet connection, the telephone company selects computer network site 18 having ADSI feature files 19 to download to the ADSI screen-display telephone terminal 12.

The computer network site 18 is on a document referred to as a "Web page." and the ADSI feature files 19 contained in the Web page is called content. Once the telephone company selects site 18 the user when it dials a preselected phone number is connected to a specific host computer on the Internet, called a "Web Server," and, more particularly, the location of a Web page located on the Web Server. A Web browser retrieves the Web page and displays it for the user on the screen display. Hypertext Transfer Protocol (HTTP) is the most widely used format to access and link users with various other Web pages or sites referenced by the original Web page. HTTP requires a program running on the host computer that understands and responds to this protocol. When a browser receives a specific request from the user, it sends the request to the Web server. The Web server receives the request and attempts to fulfill the request.

The ADSI feature file 19 on the computer network site 18 is any ADSI Feature Download file that conforms to BellCore's specifications. The BellCore specifications are set forth in "Generic Requirements for an SPCS to Customer Premise Equipment Data Interface for Analog Display Services," TR-NWT-001273 Issue 1, December 1992 BellCore. That BellCore reference is hereby incorporated into this specification by reference.

Figure 3:
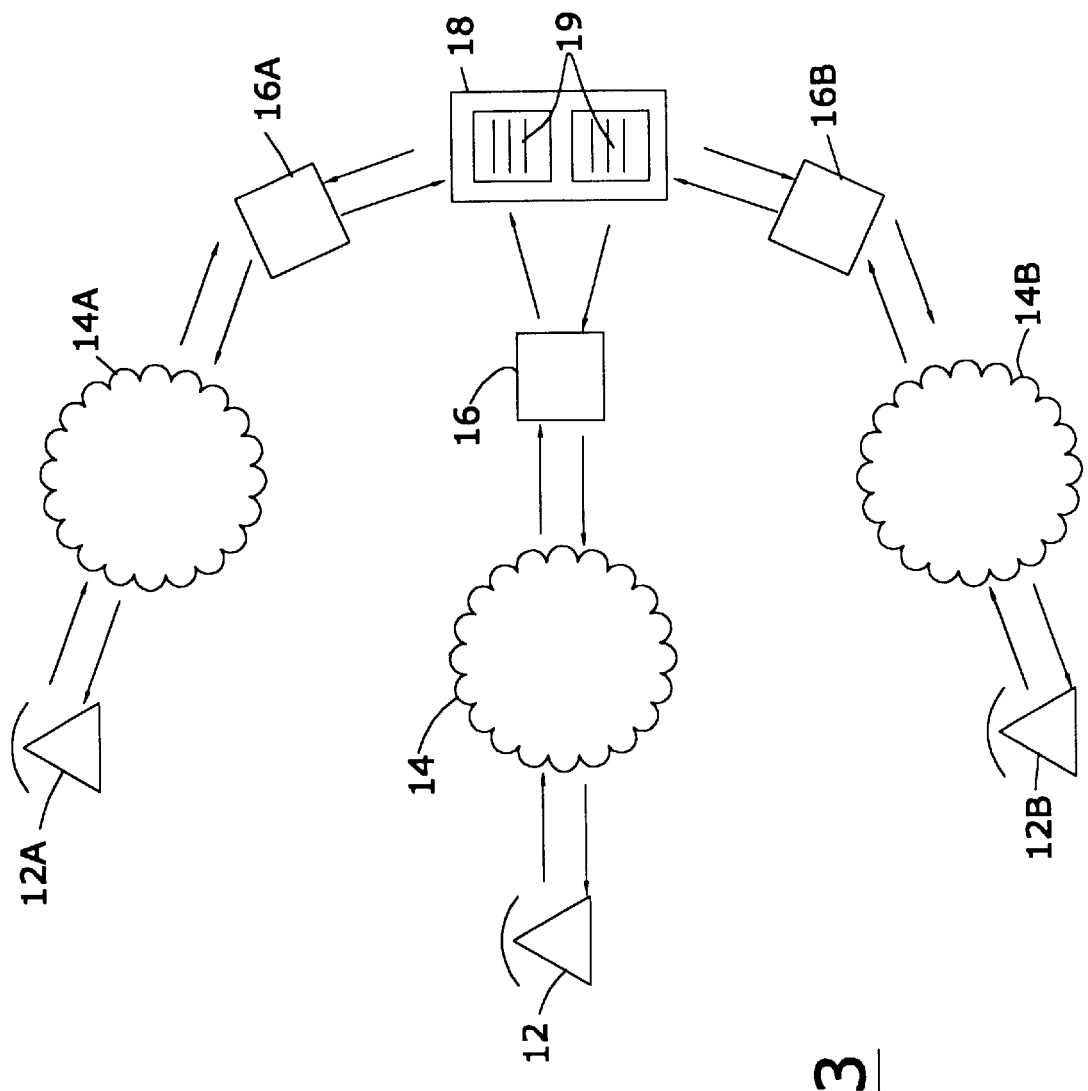
FIG. 3 is an alternative embodiment of FIG. 1.

An alternative embodiment of the present invention is shown in FIG. 3. FIG. 3 illustrates that other terminals 12*a* and 12*b* on different telephone networks 14*a* and 14*b* connect to the computer network site location 18 that contains the ADSI feature file 19. The users of terminals 12*a* and 12*b* can download ADSI feature file 19 in the same manner as the user of terminal 12. Hence, the customers of telephone networks 14, 14*a,* and 14*b* can have the same ADSI feature files as others throughout country because the telephone networks connect to the same computer network site location that contains the updated and improved ADSI feature files.

The invention has been described in detail with particular reference to certain preferred embodiments thereof, but it will be understood that variations and modifications can be effected within the spirit and scope of the invention.

What is claimed:

1. An ADSI download system with at least one ADSI compliant device and one or more remote sites, wherein at least one of said remote site contains ADSI feature files, the system comprising:

an ADSI device, having one or more storage locations for receiving and storing ADSI download feature files from a remote site, for transmitting an ADSI feature file request, and for using the ADSI feature file;

a telephony network connected to said ADSI device and said remote site; and a network application server connected to said remote site comprising at least one ADSI feature file;

wherein a user of the ADSI device selects the ADSI feature file on the remote site and the ADSI feature file is then retrieved from said remote site and is downloaded into said storage location of said ADSI device.

2. The system of claim 1 wherein said remote site is a computer network site location.

3. The system of claim 1 wherein the ADSI screen-display telephone terminal has a numeric keypad with at least one soft key and the user makes the selection of the ADSI download feature by operating said soft key.

4. The system of claim 1 wherein the ADSI download feature file is an ADSI application.

5. The system of claim 1 further comprising a second ADSI device having one or more second storage locations for receiving and storing downloaded ADSI feature files from the remote site, for transmitting an ADSI feature file request, and for using the ADSI feature file;

a second telephony network connected to said second ADSI device and the remote site; and a second network application server connected to said remote site comprising at least one ADSI feature file;

wherein a second user of the second ADSI device selects the ADSI feature file on the remote site and the ADSI feature file is then retrieved from said remote site and is downloaded into said second storage location.

6. The system of claim 1 wherein said network is a public telephone network.

7. The system of claim 1 wherein said network is a private telephone network.

8. The system of claim 1 wherein said remote site is on a publicly available network system.

9. The system of claim 1 wherein said remote site is an Internet site.

10. The system of claim 9 wherein said Internet site is a world wide web page.

11. The system of claim 1 wherein said ADSI feature file is an ADSI feature Download as defined by BellCore's specifications.

12. A method for downloading ADSI feature files from a remote site via a telephone network to an ADSI device comprising the steps of:

connecting an ADSI device, having one or more storage locations for receiving and storing ADSI download feature files from a remote site, for transmitting an ADSI feature file request, and for using the ADSI feature file;

transmitting the ADSI download feature file request from said ADSI device via a telephone network to said remote site;

transmitting the ADSI download feature file from the remote site to the ADSI device through the telephone network;

receiving the ADSI download feature file from the remote site; and downloading the ADSI download feature file into the storage location at the ADSI device.

13. The method of claim 12 further comprising the step of selecting the ADSI download feature request.

14. The method of claim 13 wherein the step of selecting the ADSI feature request comprises making the selection through at least one of a soft key selection device of a numeric selection device.

15. The method of claim 12 wherein said remote site is a computer network site location.

16. The method of claim 12 wherein said ADSI download feature file is an ADSI Feature Download as defined by BellCore's specifications.

17. The method of claim 12 wherein the remote site is on a publicly available network system.

18. The method of claim 12 further comprising the step of using the ADSI download feature file on the ADSI device.

19. The method of claim 12 wherein said network is a public telephone network.

20. The method of claim 12 wherein said network is a private telephone network.

21. The method of claim 12 further comprising the steps of:

connecting a second ADSI device, having one or more second storage locations for receiving and storing ADSI download feature files from the remote site, for transmitting an ADSI feature file request, and for using the ADSI feature file;

transmitting the ADSI download feature file request from said second ADSI device via a second telephone network to said remote site;

receiving the ADSI download feature file from the remote site;

transmitting the ADSI download feature file from the remote site to the second ADSI device through the second telephone network; and downloading the ADSI download feature file into the second storage location at the second ADSI device.

22. The method of claim 12 wherein said remote site is a world wide web page on the Internet.

* * * * *